Dec. 11, 1945.  C. E. HASTINGS  2,390,586
PISTON AND RING CONSTRUCTION
Filed May 6, 1944   3 Sheets-Sheet 1

Charles E. Hastings INVENTOR.

BY
Victor J. Evans & Co.
ATTORNEYS

Dec. 11, 1945.  C. E. HASTINGS  2,390,586
PISTON AND RING CONSTRUCTION
Filed May 6, 1944  3 Sheets-Sheet 2

Charles E. Hastings INVENTOR.

BY
Victor J. Evans & Co.
ATTORNEYS

Dec. 11, 1945.  C. E. HASTINGS  2,390,586
PISTON AND RING CONSTRUCTION
Filed May 6, 1944  3 Sheets-Sheet 3

Charles E. Hastings
INVENTOR.

BY
Victor J. Evans & Co.
ATTORNEYS

Patented Dec. 11, 1945

2,390,586

UNITED STATES PATENT OFFICE 2,390,586

PISTON AND RING CONSTRUCTION

Charles Emerson Hastings, Riddle, Idaho

Application May 6, 1944, Serial No. 534,432

8 Claims. (Cl. 309—14)

My present invention, in its broad aspect, has to do with improvements in ring construction for use with any type of piston, and by that I mean my particular invention is not limited to use with any particular form of piston, or piston and cylinder assembly, but may be used in any such construction where leakage is to be prevented, where adequate lubrication of parts is desired, where it is proposed to reduce wear, and where it is necessary to retard or eliminate the formation and accumulation of foreign deleterious matter, such as carbon or the like.

My present ring construction is characterized by the provision of mutually cooperating parts which, when assembled, reduce leakage, reduce wear of a piston and the cylinder walls, exert a sustained, uniform and desirable tension outwardly from the piston against the cylinder walls, and provide a knife edge at the top and bottom to scavenge the cylinder walls. Broadly defined, my ring contemplates a body part having secondary interfitting elements all cooperating in a unitary assembly to accomplish the above and other ends.

Other and equally important objects and advantages of my invention may be briefly defined as follows: (1) to provide a ring assembly of interfitting parts, each of which contributes to the attainment of a very definite result, such for instance as the provision of knife edges, inducing expansion, sealing joints, providing lubrication and the like, (2) to provide a ring assembly which is not in any sense limited to a particular form of piston or piston and cylinder assembly; and (3) to provide a multiple interfitting part construction which is easily set up and taken down, is not complicated, and which is sturdy and practical for the purposes for which it is intended.

Other objects and advantages will be apparent as the description proceeds, but I wish it emphasized and understood that whereas I have used certain forms and constructions for purposes of illustration, I do not intend thereby to limit the scope of my broad inventive concept, except as may be indicated by the scope and interpretation of the appended claims.

In the drawings, I have shown for purposes of illustration only a trunk-type piston to which my invention, and some modified forms of my invention are shown applied, and in which.

In the drawings wherein like characters of reference are used to designate like or similar parts throughout the several views.

The letter A illustrates a common type of trunk piston having a head B and a skirt C. It is to be understood that my present invention is not limited to any particular type of piston or piston and cylinder assembly, and that the conventional showing of a piston herein is only for purposes of illustration and to impart a clear understanding of the construction and operation of my invention.

Since my ring construction per se constitutes the gist of my invention, I shall introduce the description by referring first to Figures 9, 10, 11, 12, 13 and 14 wherein various forms of detail construction of my ring are shown without other associated mechanism.

Figure 11:
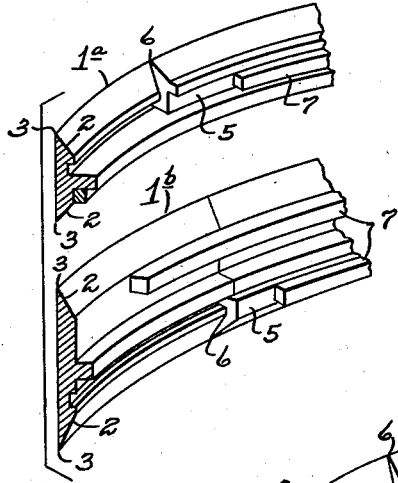
Figure 11 is a fragmentary perspective detail view of a form of my invention as shown applied to a trunk-type piston in Figure 3.
Figure 12:
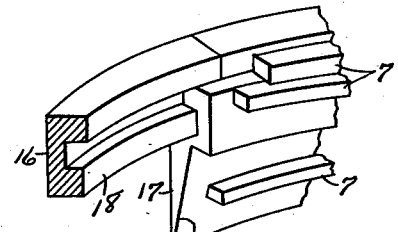
Figure 12 is a fragmentary perspective detail view of a form of my invention shown as applied to a trunk-type piston in Figure 4.

Generally speaking, I provide a body part or main outer ring 1 which is internally beveled at the upper and lower edges as at 2 to provide a knife edge 3 both top and bottom and split as at X. This ring may have an internal, annular boss or rib 4—see Figure 10—which fits into a groove or recess in the body of any piston to which my ring is applied. Sealing rings 5 are assembled with the main outer ring and have knife edges 6 flared outwardly to be disposed back of, and tight against, and in registry with the knife edges 3 and have other parts cooperating with ring 1 which will be hereafter described. An inherently split expansible ring 7 is provided with each sealing ring and serves to urge the sealing rings against the outer ring, and the outer ring against the cylinder wall. There may be more than one outer ring—as in Figure 11. There may be more than two expansible or spring rings 7 as shown in Figures 11 and 12, and there may be variations in arrangement of the sealing rings and the like, but the broad inventive concept in any case is the same; namely, to provide an outer wearing surface as furnished by the form of outer ring; to provide the knife edges; to provide a sealing ring with knife edges; to provide an expansion means; and by these parts in modification, association, form, arrangement and shape to reduce wear, maintain proper pressure against a cylinder wall, reduce leakage, provide lubrication, and prevent formation and accumulation of deleterious extraneous or foreign matter, such, for instance, as carbon.

Figure 1:
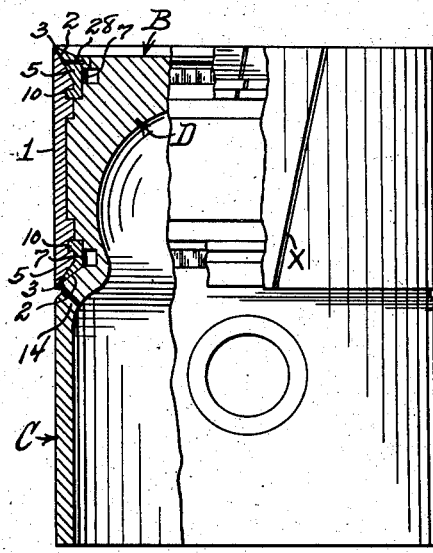
Figure 1 is a side elevation partly broken away of a trunk-type piston in which the beveled inner rings form knife edges top and bottom with expansion spring rings for each, forcing the beveled inner rings against the body of my rings and thence expanding both to insure proper contact against a cylinder wall.
Figure 9:
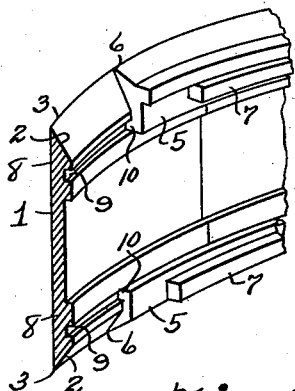
Figure 9 is a fragmentary perspective detail view of a form of my invention as shown applied to a trunk-type piston in Figure 1.

Referring particularly to Figures 1 and 9: I provide the body part or outer ring 1 with internal beveled edges 2 forming knife edges 3 top and bottom as previously described. This is, of course, a split ring construction and is much wider than the conventional piston ring, and has a thickened part 8 adjacent both the top and bottom edges, each of which is formed with an annular groove 9.

An annular rib 10 is provided on a sealing ring 5; there being one ring at the top of the ring 1 and another at the bottom. The ribs 10 seat in the grooves 9—see Figures 1 and 9—and each sealing ring 5 has an outwardly flared knife edge 6 which lies back of and against and in registry with the cooperating knife edge of the outer ring. Pressing against and seated inside the boss 11 of each sealing ring 5 is an inherently expansible, or spring expansion ring 7 which functions to force the seating ring against the outer ring 1 with the knife edges together, and by the same token to force the outer ring into tight and proper contact and engagement with a cylinder wall. To accommodate the ring assembly, as above described, a piston (such as is shown in Figure 1) is formed with a thickened head as at D which is provided with an exterior formation of cooperating recesses and grooves receiving and supporting the ring assembly, so that the assembly conforms to the normal cylindrical pattern of the piston. The piston wall is grooved as at 30 beneath the lower knife edge to assist the functioning of such edge in scavenging the cylinder walls.

Figure 2:
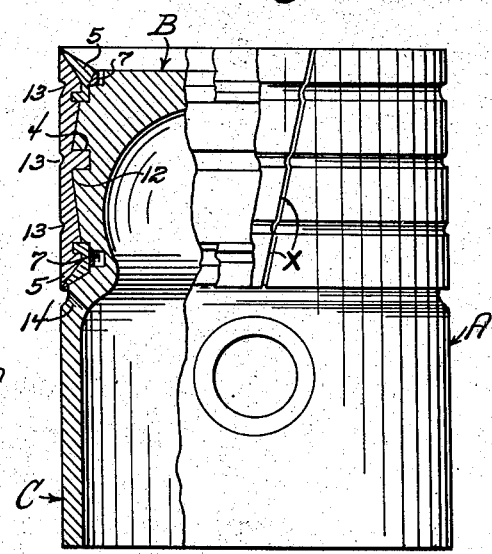
Figure 2 is a side elevation similar to Figure 1 showing a modified form where an annular boss or rib fits into a groove or channel in the piston head.
Figure 10:
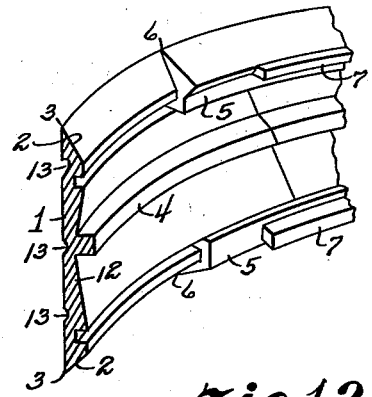
Figure 10 is a fragmentary perspective detail view of a form of my invention as shown applied to a trunk-type piston in Figure 2.

As shown in Figures 2 and 10, the inner wall 12 of the outer ring 1 may be slightly crowned, and at the crown an annular rib or boss 4 is provided which is received in a channel or groove in the piston body. The outer surface of the outer ring 1 has spaced annular grooves 13, and in both forms—that is, those shown in Figures 1 and 9 and 2 and 10—vents 14 are provided in the piston wall leading to groove E and it will be noted that the upper knife edge extends above the crown of the piston head. Since the outer ring, the sealing rings and spring rings are split, the split joints are preferably staggered in the assembly and the interfitting relationship of the parts affords an effective seal.

Figure 3:
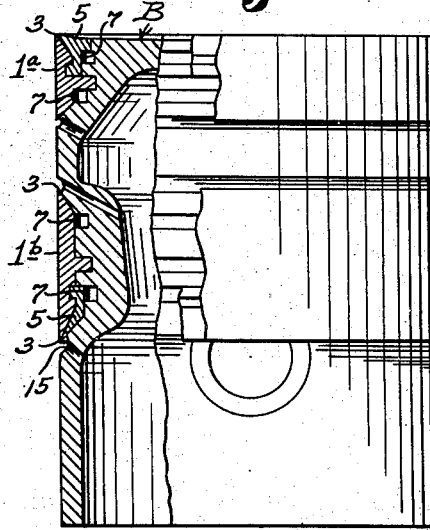
Figure 3 is a side elevation similar to Figure 1, and shows, among other things, a multiple ring body construction with venting channels.

In Figures 3 and 11, the body part or outer ring is characterized by upper and lower section 1a and 1b respectively each of which has knife edges, but it will be noted that the upper knife edge of the lower section 1b and the lower knife edge of upper section 1a are not backed-up or associated with sealing rings 5 of which there are two as in the previously described forms. However, in this form, the piston is also provided with intermediate oil drains or channels 15 between sections 1a and 1b.

Figure 4:
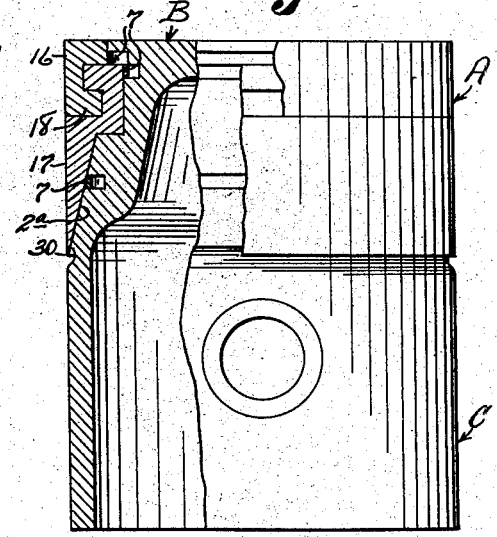
Figure 4 is a side elevation similar to Figure 1 showing a further modification.

In Figures 4 and 12, the ring construction is in upper and lower sections designated respectively 16 and 17 with a lap-joint 18 connecting the two and a lower knife edge construction 2a. Three inherently expansible rings or expansion rings 7 are used in this form, one for upper section 16 and two for lower section 17—one of which is mounted beneath the knife edge 2a.

Figure 5:
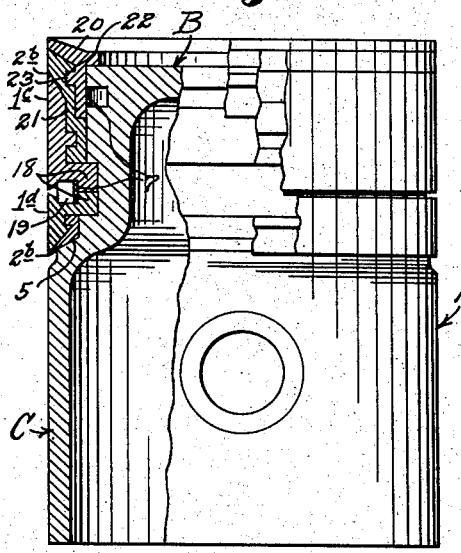
Figure 5 is a side elevation similar to Figure 1 showing a two part sealing ring construction.
Figure 6:
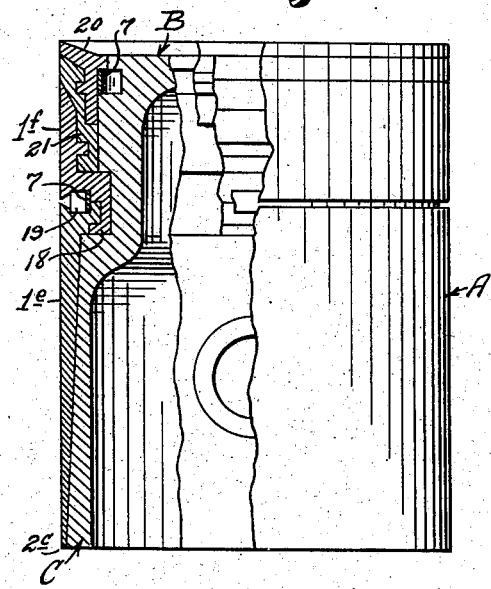
Figure 6 is a side elevation similar to Figure 1 showing a modified form along the lines of the form shown in Figure 5.

In the form of my invention shown applied to a trunk piston in Figure 5, there are upper and lower sections 1c and 1d each having beveled knife edges 2b; the sections are provided with opposed L-shaped flanges 18 meeting to form a channel 19 in which is seated an expansion ring 7. Associated with the lower beveled edge 2b of lower section 1d is a sealing ring 5, and back of the upper ring section 1c is a secondary ring section formed with superposed interlocking parts 20 and 21; the uppermost of which has a groove engaging the annular rib 22 of upper ring section 1c, and the undermost of which has an annular rib 23 engaging in a groove in part 20. An expansion ring 7 is provided beneath undermost part 21. In Figure 6 a construction in some respects similar to that of Figure 5 is shown, but in this form the skirt C of the piston A is beveled and carries an extended ring section 1e having a knife edge 2c and an expansion ring 7 is mounted in channel 19 formed by the cooperating L-shaped flange 18 of the ring 1b. Ring section 1e extends the entire length of the skirt C; said skirt C being reduced to receive the ring section. The superposed interlocking parts 20 and 21 of this form are the same as in Figure 5.

Figure 7:
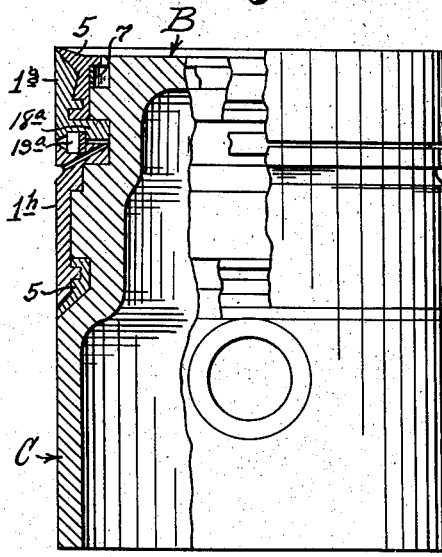
Figure 7 is a side elevation similar to Figure 1 showing a multiple ring body construction.
Figure 14:
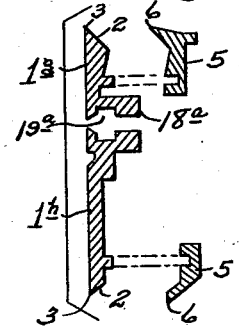
Figure 14 is an exploded vertical sectional view of a form of my invention as shown applied to a trunk-type piston in Figure 7.

In Figures 7 and 14, there is shown a modification wherein the outer ring is formed with sections 1g and 1h with an L-shaped flange formation 18a providing a channel 19a to receive an expansion ring 7. Knife edge sealing rings 5 are provided which are similar in construction to those shown in Figures 1, 2 and 3, and 9, 10 and 11.

Figure 8:
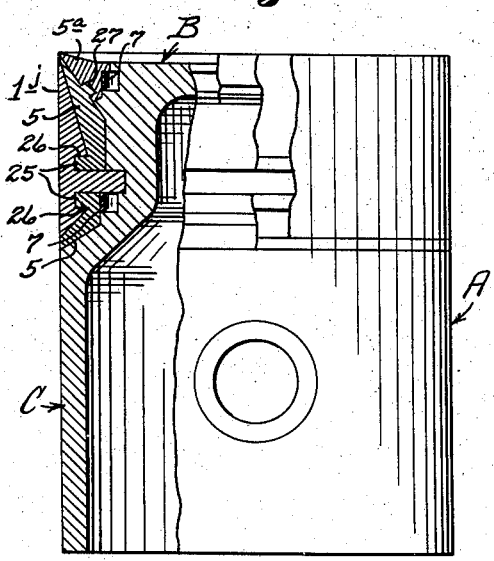
Figure 8 is a side elevation similar to Figure 1 showing a multiple sealing ring construction having knife edges registering.
Figure 13:
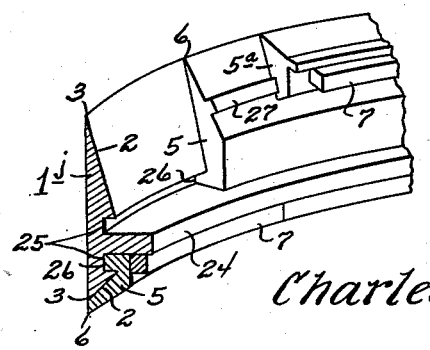
Figure 13 is a fragmentary perspective detail view of a form of my invention as shown applied to a trunk-type piston in Figure 8.

In Figures 8 and 13 a still further modification is shown in which the outer ring 1j has a relatively deep rib 24, and grooves 25 adjacent the rib 24 in which are respectively fitted the ribs 26 of sealing rings 5. There is a supplemental sealing ring 5a beneath the upper ring 5 so that in effect the knife edge formation at the top of the piston is attained by registration and cooperation of the knife edges of outer ring 1j; the upper sealing ring 5, and the sealing ring 5a. Sealing ring 5a has a groove in which is fitted a rib 27 on upper sealing ring 5 and an expansion ring 7 is mounted beneath ring 5a and another beneath lower ring 5.

It will be noted that a thin metal insert or filler 28 may be provided to serve as a joint packing in all forms of my invention if desired, an example of which is shown in Figure 1.

While it is believed that the operation and construction, and method of assembling the several parts of my invention will be apparent from the foregoing, it is pointed out that my invention is essentially an improvement in ring assemblies to be used with any type of piston or piston and cylinder organization. It is further pointed out that my broad concept calls for a multiple part ring assembly in which an outer or main ring 1 has knife edges, and upon and beneath which are other, or secondary parts, including the knife-edged sealing rings, the expansion rings, and the like which function to reduce leakage, maintain pressure, insure proper lubrication, reduction of wear of the piston and cylinder walls, prevent slap and reduce formation and accumulation of extraneous deleterious matter, such as carbon and the like. Furthermore, my device is easy and inexpensive to install, requires a minimum of modification of ordinary piston construction, and is sturdy and efficient in operation.

It is pointed out, however, that interpretation of my invention and its scope should only be conclusive when made in the light of the subjoined claims, and that changes in form, size, shape and arrangement of parts may be made without departing from the spirit of my invention.

I claim:

1. A piston ring construction, comprising an outer ring means formed with beveled parts providing knife edges adjacent the walls of a cylinder, said outer ring mounted on a piston, a sealing means between the outer ring means and the piston and interengaging with the outer ring means to be carried thereby, said sealing means having beveled parts forming knife edges cooperating with those of the ring means, and inherently expansible means associated with the sealing means and exerting expansible action, both with respect to the sealing means and the outer ring.

2. A piston ring construction, comprising relatively wide outer ring means formed with internally beveled parts providing knife edges adjacent the walls of a cylinder, said outer ring mounted on a piston to shield the same, annular sealing means between the outer ring means and the piston and interengaging with the outer ring means to be carried thereby, said sealing means having internally beveled parts flared outwardly to form knife edges engaging, registering with and cooperating with the knife edges of the ring means, and inherently expansible means associated with the sealing means and exerting expansible action both with respect to the sealing means and the outer ring.

3. A multiple part piston ring construction, the respective parts of which are formed to interengage to be assembled and cooperate as a unit, and comprising an outer part and an inner part, the outer part contacting the cylinder wall, a sealing element between the outer part and the inner part, and the inner part being inherently expansible and engaging the sealing element and the piston.

4. A multiple part piston ring construction, the respective parts of which are formed to interengage to be assembled and cooperate as a unit, and comprising outer, relatively wide ring means formed with knife edges, inner inherently expansible means, and sealing means formed with knife edges engaging and cooperating with the knife edges of the outer ring means, and located between the inner expansible means and the outer ring means to be acted upon by the expansible means to be pressed against the outer ring means.

5. A multiple part piston ring construction, the respective parts of which are formed to interengage to be assembled and to cooperate as a unit, comprising outer relatively wide ring means mounted on a piston to shield the same, edges of said ring means being internally beveled to form knife edges, inherently expansible ring means, sealing means engaged by the expansible ring means, and located between the expansible ring means and the outer ring means, and having internally beveled and outwardly flared edge portions forming knife edges engaging, registering with, and cooperating with the knife edges of the ring part.

6. A piston ring construction comprising a plurality of relatively interfitting parts functioning as a unit and including relatively wide ring means with knife edges, sealing means with knife edges cooperating with the first mentioned knife edges, and expanding means for forcing the sealing means against the ring means, and the ring means against a cylinder wall.

7. A piston ring construction, comprising a plurality of relatively interfitting parts functioning as a unit, and including an outer annular element, an inner annular element and an intermediate annular element between the outer element and the inner element, and each interengaged to be carried by the other, the innermost element being inherently expansible to force the other elements into close contact with each other, and both the outer and intermediate elements having cooperating knife edges, in combination with a piston formed to receive and support such elements.

8. A piston ring construction, comprising a plurality of separable, relatively interfitting parts functioning in assembly as a unit, and including relatively wide outer ring means having knife edges, sealing means beneath and interengaged with the outer means, there being ribs and receiving grooves for that purpose, said sealing means having knife edges bearing against, and in registry with, and cooperating with the knife edges of the outer ring means, and inherently expansible means cooperating with the sealing means and functioning to press the sealing means against the ring means, and the ring means against a cylinder wall, in combination with a piston formed to receive the assembly, and having means formed therein cooperating with knife edges, and other means forming vents, and said cooperating, interfitting parts having means for sealing the same against passage of liquid between or around them.

CHARLES EMERSON HASTINGS.